Dec. 5, 1950 L. A. RICHARDS ET AL 2,532,643
ROCKET LAUNCHER
Filed Aug. 13, 1945 3 Sheets-Sheet 3
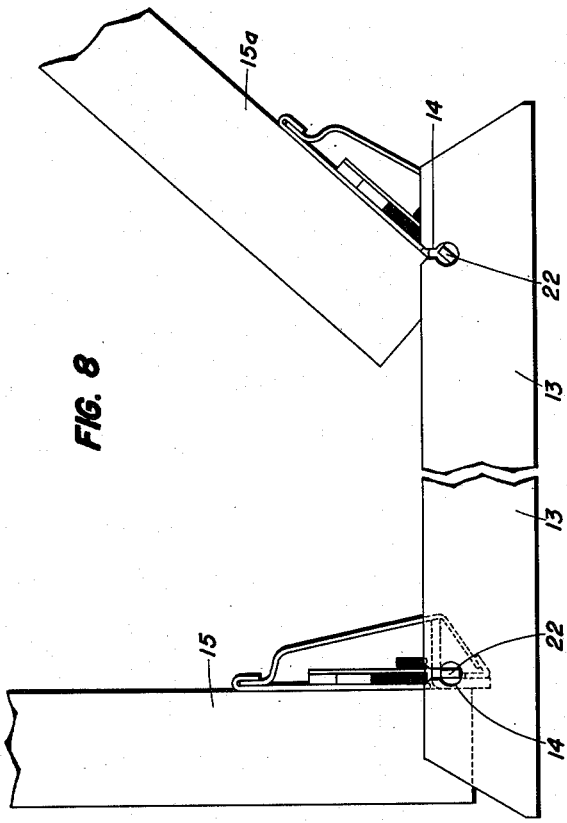
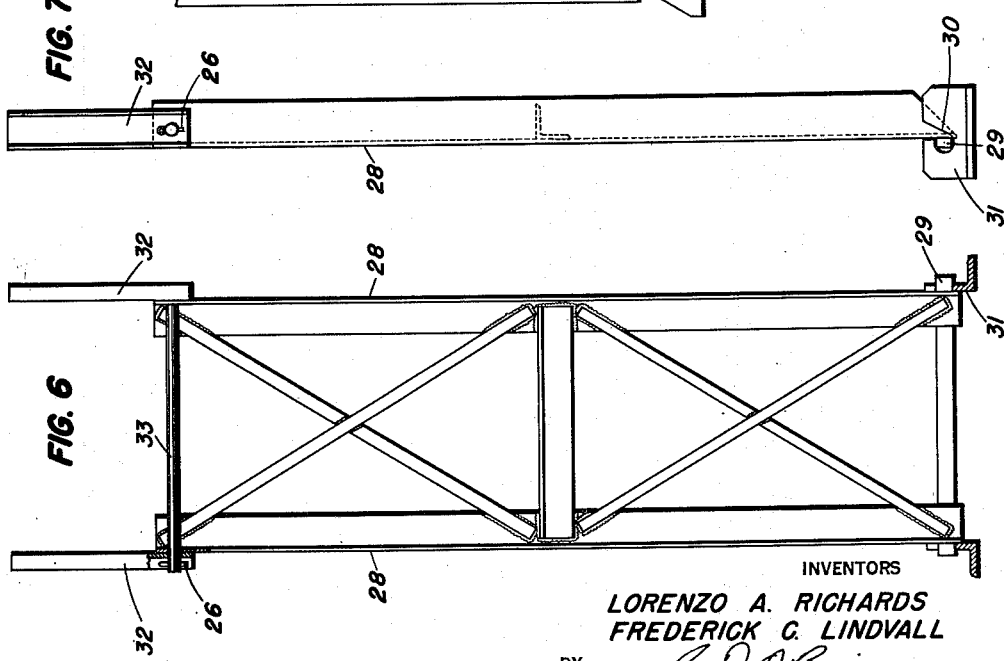
INVENTORS
LORENZO A. RICHARDS
FREDERICK C. LINDVALL
BY
ATTORNEY Patented Dec. 5, 1950

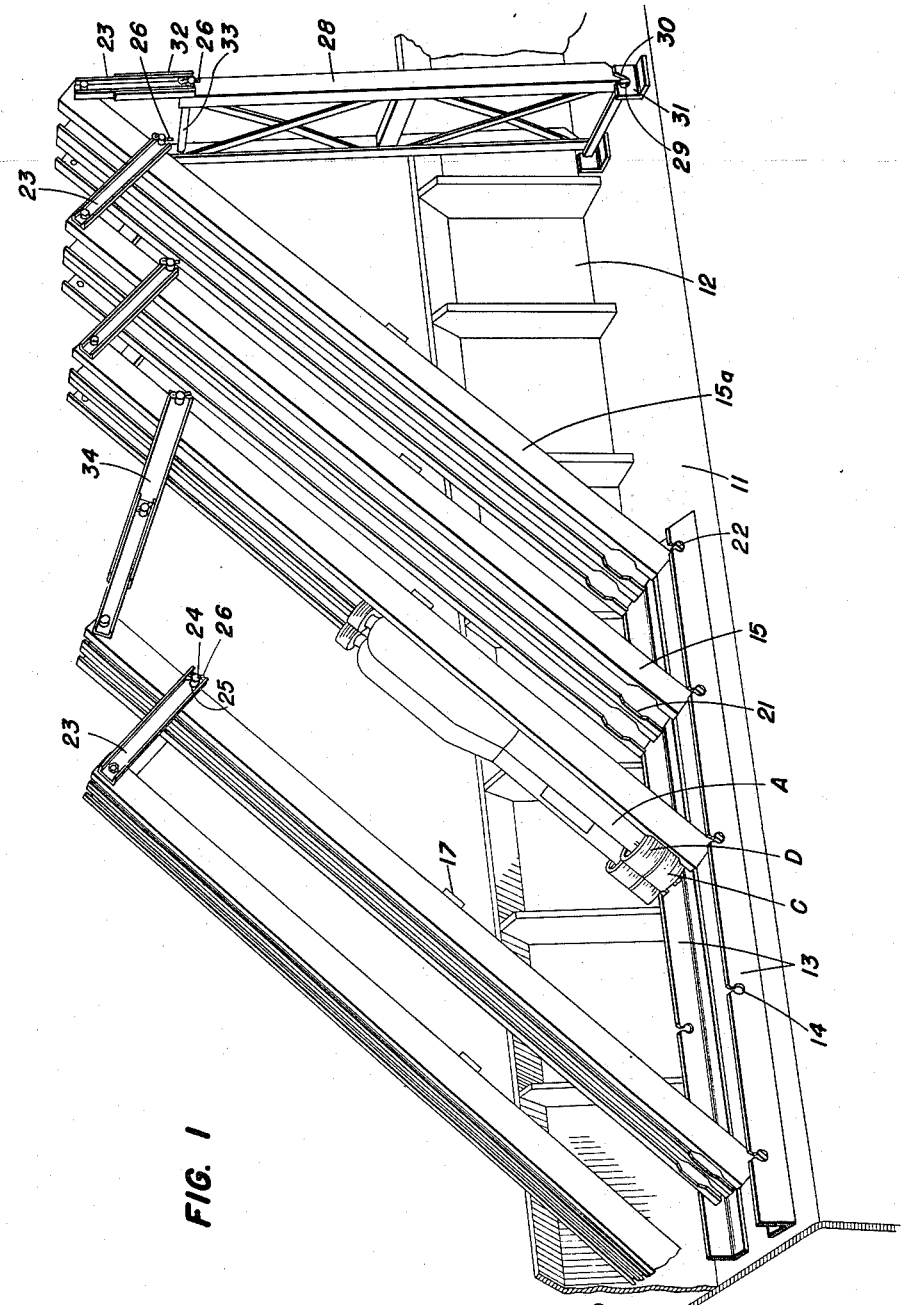

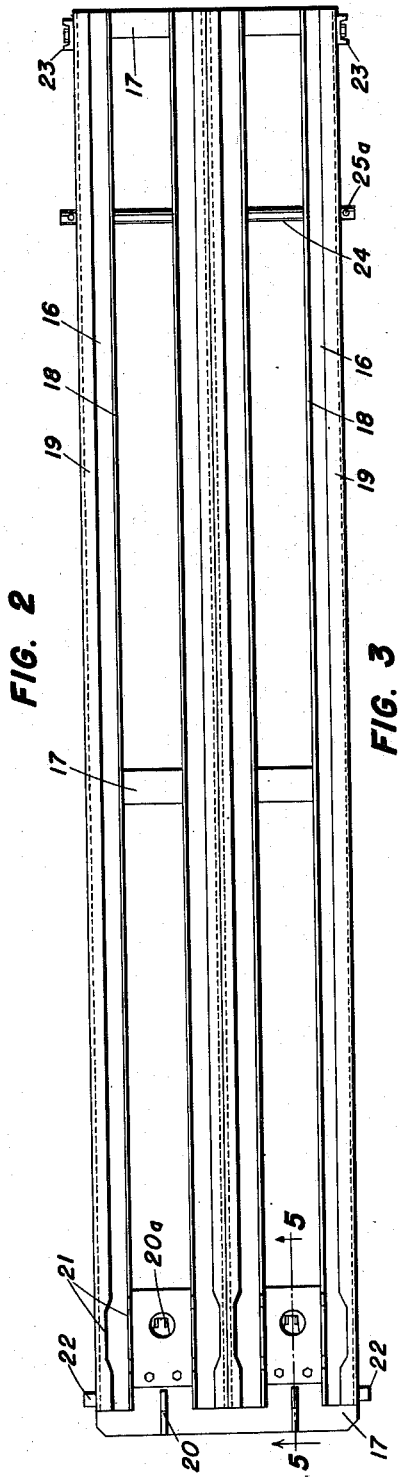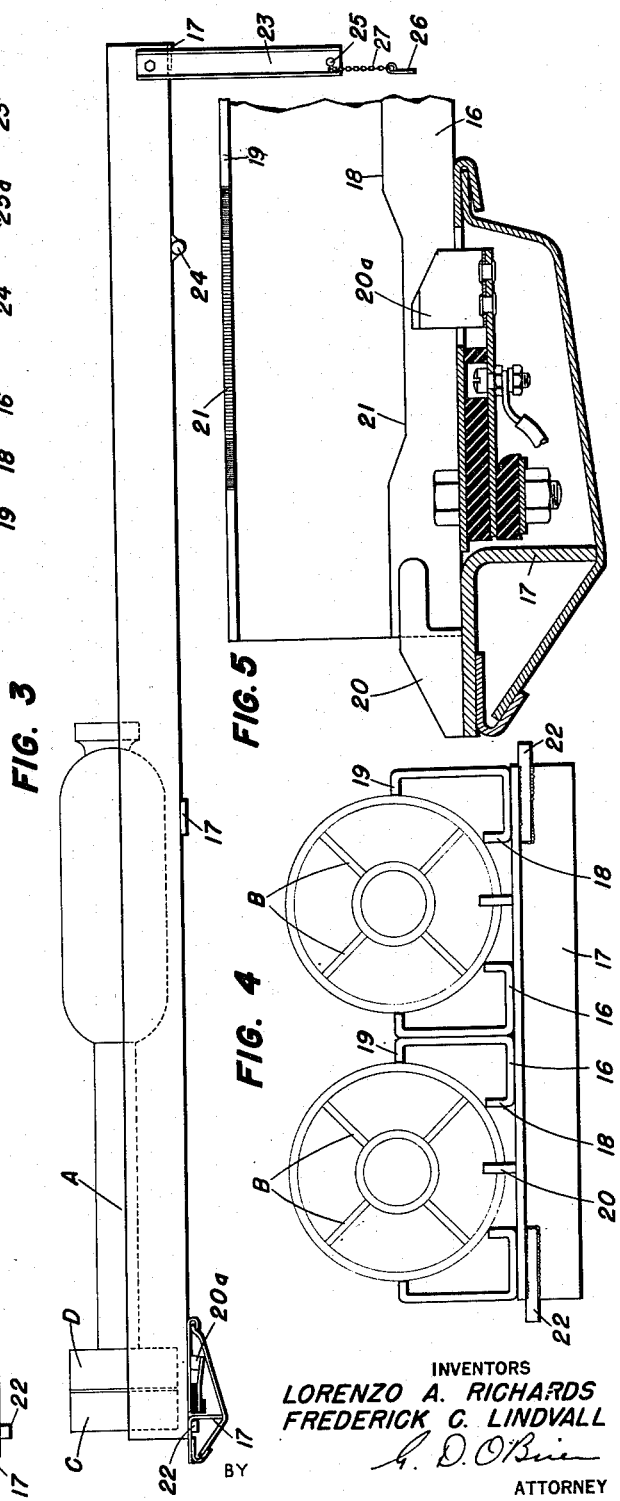

2,532,643

UNITED STATES PATENT OFFICE 2,532,643

ROCKET LAUNCHER

Lorenzo A. Richards, Riverside, and Frederick C. Lindvall, Altadena, Calif., assignors to the United States of America as represented by the Secretary of the Navy Application August 13, 1945, Serial No. 610,656

2 Claims. (Cl. 89—1.7)

This invention relates to barrage rocket launchers, and more particularly to a novel device for guiding and directing the initial travel of rocket devices.

An object of the invention is to provide a demountable rocket launcher which comprises a plurality of interchangeable rocket guiding units so mounted that the number of units may be readily increased or decreased.

Another object of the invention is to provide a rocket launcher comprising base members attached to a platform, and a plurality of rocket guiding units which may be readily assembled on the base members and disassembled without tools.

Another object of the invention is to provide a rocket launcher which is particularly adapted for installation on the narrow decks of landing craft or tank lighters.

A further object of the invention is to provide a barrage rocket launcher particularly adapted to launch electrically fired rockets of the type disclosed in the copending patent application of Charles C. Lauritsen, Ser. No. 481,645, filed April 2, 1943 now patent No. 2,469,350.

These and other objects of the invention will be apparent from the following specification and the accompanying drawings, in which:

Fig. 1 is a perspective view of one form of the rocket launcher mounted on the deck of a landing craft;

Fig. 2 is a plan view of one of the rocket guiding units;

Fig. 3 is a side elevation view of the unit shown in Fig. 2 with a rocket device shown in launching position by dotted lines;

Fig. 4 is an end view of one of the units shown in Fig. 2;

Fig. 5 is a detailed sectional view taken on line 5—5 of Fig. 2 showing the electrical contact assembly;

Fig. 6 is an elevational view of the end supporting structure;

Fig. 7 is a side elevational view of the support shown in Fig. 6; and

Fig. 8 is a fragmentary side elevational view of a portion of the base support for the rocket guiding units, showing fragmentarily one rocket guiding unit in a locked position and another in its unlocked position.

The embodiment of our invention herein illustrated is particularly designed for installation on the narrow deck of a landing craft, but it may also be utilized to advantage on other mounting platforms. As shown in Fig. 1, the craft 10 has a narrow strip of decking 11 separated from the cargo space of the craft by a wall 12.

The barrage rocket launcher is mounted along decking strip 11 on a pair of longitudinally extending angle members 13 secured to the decking. The angle members have a series of spaced keyhole slots 14 arranged in pairs for mounting a plurality of rocket guiding units 15 as shown best in Figs. 1 and 8.

Each unit 15 is formed of two adjacent pairs of L-shaped rail members 16 (Fig. 4), the rail members of each pair facing each other and the two inner members positioned back to back. Cross members 17 are joined to the horizontal or shorter legs of the rail members and hold the rail members in proper position to form a pair of rocket guiding tracks. The extremities of the horizontal legs of the rail members are turned upwardly to form flanges 18 while the extremities of the vertical or longer legs of the rail members are turned inwardly to form flanges 19. The edges of the flanges 18 and 19 of each track define points on a circle and thereby provide four-point support for a rocket projectile, as shown in Figs. 1, 3 and 4.

The rocket projectiles illustrated in Figs. 1, 3 and 4 are more completely described in the above mentioned patent application, but comprise generally an electrically ignited rocket motor A provided with tail fins B which carry a pair of ring members C and D, one of which is grounded and the other of which is insulated. The rings are electrically connected to opposite terminals of an electrical igniter within the rocket motor.

In order to ignite the rocket motor, the cross member 17 at the lower end of the rocket guiding unit carries a rigid grounding contact 20 for each track and a spring mounted live contact 20a, as shown in Figs. 2 and 5. These engage, respectively, the grounded ring C and insulated ring D of a rocket motor on the track. The flanges 18 and 19 are cut away at 21 to clear the insulated ring D, the rear end of the rocket projectile being supported by the grounded ring C which serves both as a stop and as a contact.

The lower end of each rocket guiding unit, that is, the end carrying the contacts 20 and 20a, is provided with lateral journal pins 22 extending beyond the rail members 16 and flattened on two sides to fit into the keyhole slots 14 of the angle members 13, as shown best in Fig. 8. The slots are so shaped that the pins may be placed therein when the rocket guiding unit is vertical, and lock into the slots when the unit is inclined.

The upper end of each rocket guiding unit is provided with a pair of pivotally mounted spacer arms 23. A cross bar 24 is welded to the under side of each unit a short distance from its upper or extended end and projects laterally beyond the edges of the unit to engage holes 25 in the spacer bars. Retainer pins 26, attached by chains 27 to the arms 23, fit into holes 25a in the extremities of the cross bar 24 to secure the parts together. The length of arms 23 and the distance between slots 14 in base members 13 are such that the rocket guiding units are maintained in parallel relation to each other.

The end unit 15a is exactly like the other units and is supported by an end frame 28, shown in Figs. 1, 6 and 7. The end frame is provided at its lower end with pins 29 which fit into slots 30 provided in angle brackets 31 secured to the decking forward of the angle members 13, the slots 30 being shaped to receive the end frame in an angular position and lock said frame to the members 13 when swung upright in the position illustrated.

The upper end of the end frame 28 is provided with rigid, upwardly extending arms 32 of channel section which slidably receive the spacer arms 23 of the end unit 15a. The arms 32 are mounted on the frame 28 by means of a cross bar 33 carried by the upper end of frame 28 and having extremities which project into the lower ends of the arms 32 and fit into the holes 25 of the spacer arms 23 of the forward unit 15a.

When assembled as shown in Fig. 1, the several rocket guiding units are directed upwardly and forwardly in parallel relation, each unit being supported at its upper end by the adjacent forwardly positioned unit and with the forwardmost unit 15a supported by frame 28.

To install the launcher, the pins 29 of the end frame 28, are slipped in an inclined position into the slots 30 of the bracket members 31 permanently attached to the deck, and are then rotated to a vertical position. In this position the pins 29 are locked in the slots 30. The pins 22 of the forward rocket guiding unit 15a are then slipped vertically into the slots 14 and the unit rotated forwardly. In the forwardly inclined position the pins 22 lock in the slots 14. The spacer arms 23 are fitted in the channels 32 and over the ends of cross bar 33, the connection of these arms with the unit 15a being loose enough to permit the required spreading movement.

After insertion of the pins 26 in the ends of the cross bar 33, the forward rocket guiding unit is securely held in a forwardly inclined position. The pins 22 of the succeeding projector units are inserted in the slots 14 and their spacer arms fitted over the ends of the cross bar 24 of the preceding unit. If it is necessary to clear some obstacle on the platform, extension arms 34 may be used as shown in Fig. 1 and one pair of slots 14 is left unused.

It will be observed that, except for securing the angle members 13 and the brackets 31, which may be permanent fixtures, these units may be quickly assembled or disassembled without tools and under adverse conditions. For example, less than thirty minutes is required to install on a landing craft a forty-four unit launcher and load it with eighty-eight rockets. Each rocket guiding unit is comparatively light and capable of being handled by one man. Furthermore, when not in use, the rocket guiding units nestle compactly so that they may be stored in a limited space.

A two-lead conductor, not shown, is provided for each rocket guiding unit for connecting the contacts 20 and 20a to a suitable electrical network and apparatus for controlling the firing of the rocket projectiles from the different projector units.

We claim:

1. A rocket launcher comprising an elongated horizontal base having laterally spaced and confronting flanged uprights, bracket members in virtual continuation of the uprights but spaced beyond one extremity of the base, an end frame erected from said bracket members, a plurality of rocket guiding units supported on the base, each of the units having at one of its ends pins by which it is journaled in the flanged uprights for turning into a tilted position, means securing the top of the end frame to the nearest unit to establish the amount of tilt, and interconnections between said nearest unit and the succeeding units to support the latter in parallelism to said nearest unit.

2. A rocket launcher comprising a horizontal base having laterally spaced and confronting flanged uprights with transversely paired keyhole slots enterable at the upper edges of the uprights, a plurality of rocket guiding units having journal pins protruding laterally of the lower ends of the units, being flattened to enter the slots for turning therein for the assumption by said units of tilted positions in reference to the base, an end frame having supporting means spaced beyond one extremity of the base, said frame having the nearest tilted unit attached to it, and interconnections at and between the tops of the units and the top of the end frame providing mutual parallel support between the units and maintaining the tilted positions thereof.

LORENZO A. RICHARDS.
FREDERICK C. LINDVALL.

REFERENCES CITED

The following references are of record in the file of this patent:

UNITED STATES PATENTS

| Number | Name | Date |
|---|---|---|
| 573,353 | Potts | Dec. 15, 1896 |
| 1,301,820 | Clinger | Apr. 29, 1919 |
| 1,790,873 | McBride | Feb. 3, 1931 |

OTHER REFERENCES

Coast Artillery Journal, pages 42 and 43, July-August 1943.

Popular Mechanics Magazine, pages 1 and 2, March 1945.